United States Patent [19]

Lewis, Jr. et al.

[11] 4,322,802

[45] Mar. 30, 1982

[54] CONTROL APPARATUS FOR ADJUSTING THE POSITION OF A WORKPIECE

[76] Inventors: Clarence A. Lewis, Jr.; James E. Lewis; Richard D. Lewis, all of R.D. #3 Box 115, Blairstown, N.J. 07825

[21] Appl. No.: 140,290

[22] Filed: Apr. 10, 1980

[51] Int. Cl.[3] .......................... G05D 3/00; D06C 3/06

[52] U.S. Cl. ........................................ 364/470; 26/98; 26/DIG. 1

[58] Field of Search .............. 364/470; 26/98, DIG. 1

[56] References Cited

U.S. PATENT DOCUMENTS

| | | | |
|---|---|---|---|
| 3,002,222 | 10/1961 | Sevison | 26/DIG. 1 X |
| 3,740,805 | 6/1973 | Catallo | 26/DIG. 1 X |
| 3,858,415 | 1/1975 | Wilson et al. | 364/470 X |
| 4,097,973 | 7/1978 | Cho | 26/98 X |

OTHER PUBLICATIONS

Innes: New Novakust Tenter Features Electronic Controls, Knitting Times, vol. 48, No. 32 Jul. 30, 1979.

*Primary Examiner*—Felix D. Gruber
*Attorney, Agent, or Firm*—Thomas L. Adams

[57] ABSTRACT

A web is conducted through various equipments for printing, cutting, creasing etc. It is important to make certain positional adjustments of the web as it travels through such equipment. For example, a web supplied from a roll has a natural but deleterious tendency to curl. A web decurler cancels this tendency by inducing a reverse curl. A web decurler or other such web handling equipment is adjusted through a control signal from a control signal generator. The control signal generator includes a metering device for producing a web signal signifying the longitudinal displacement of the web. Also included is a sensor for producing an adjust signal, signifying the extent of adjustment of the web. A manually operable device can vary the control signal and thus adjust the decurler or other such web handling equipment. A memory is used to store at least one contemporaneous pair of values of the web and adjust signals during an initial interindex interval. Also included is an automatic device for periodically varying the control signal from index to index to cause the value of the adjust and web signals to periodically correspond to the contemporaneous pair of values. Thus an initial manual adjustment subsequently controls the automatic operation of the control signal generator.

31 Claims, 5 Drawing Figures

FIG. 2
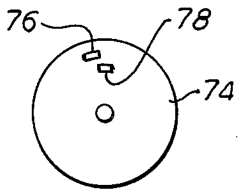
FIG. 3
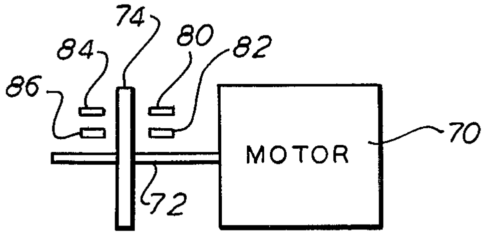
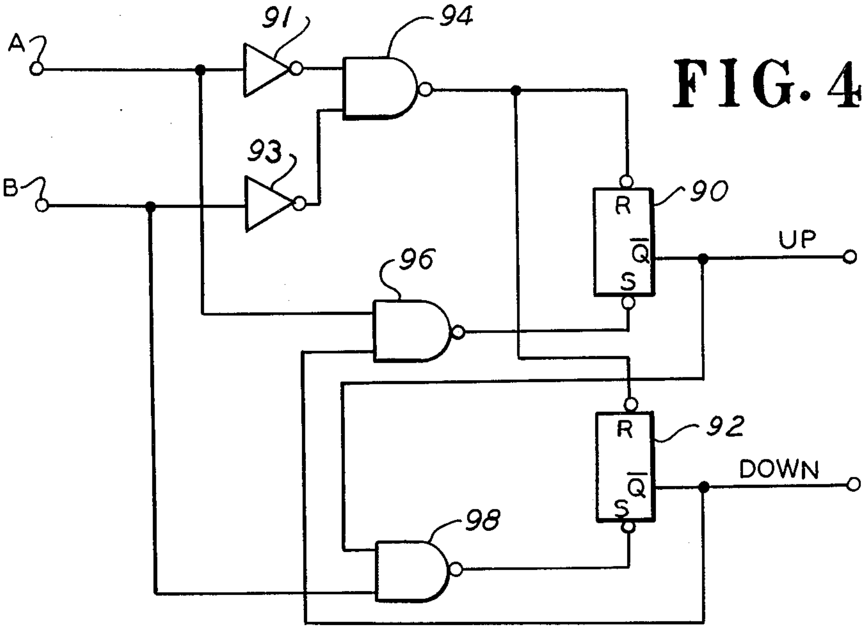
FIG. 4
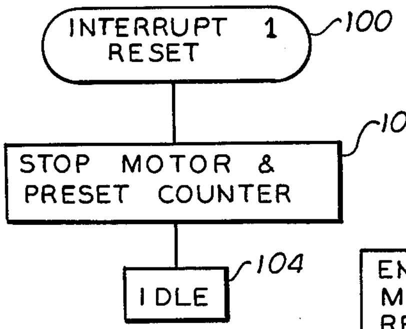
FIG. 5A
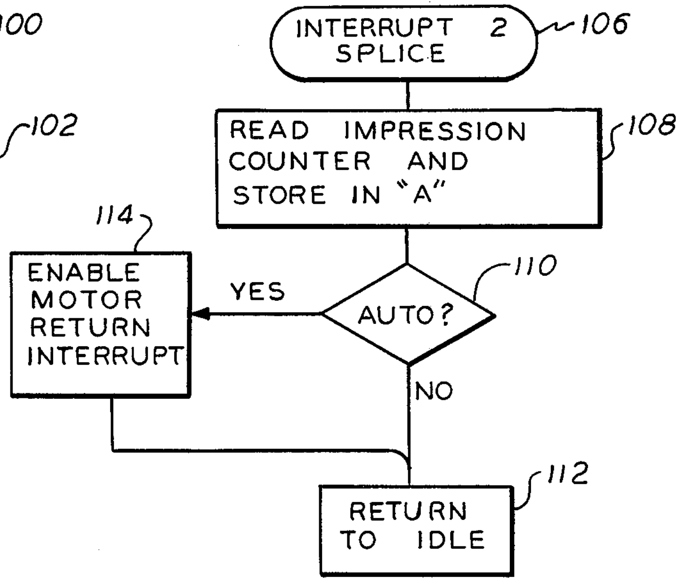
FIG. 5B FIG. 5C
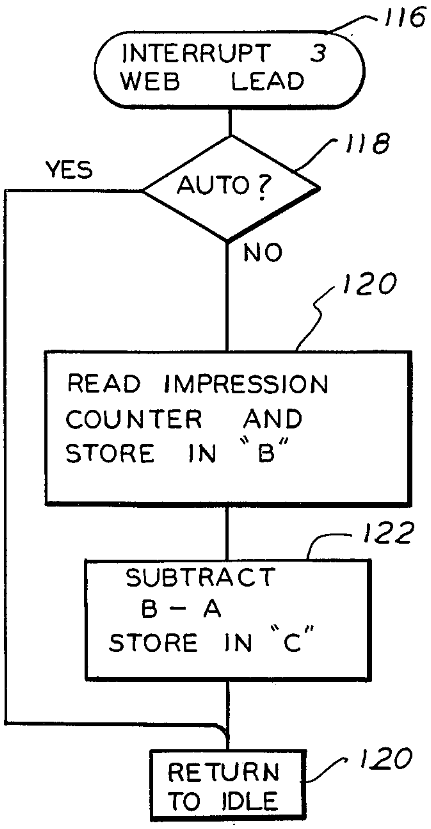
FIG. 5D
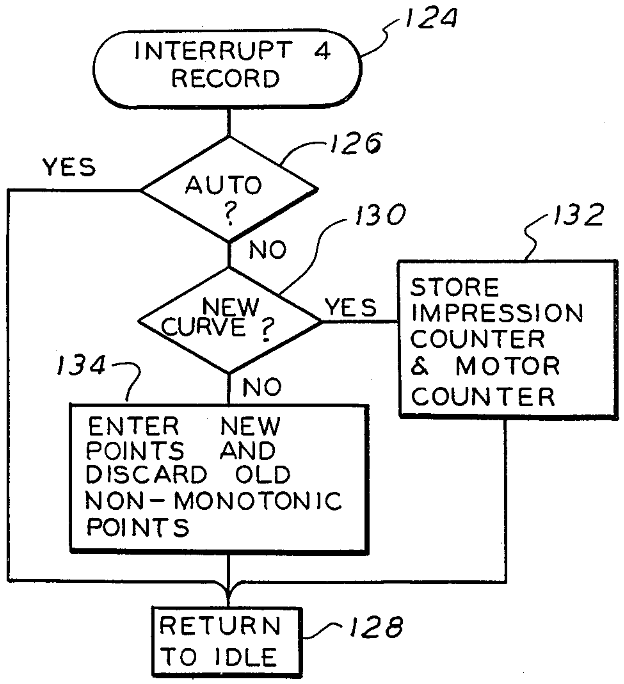
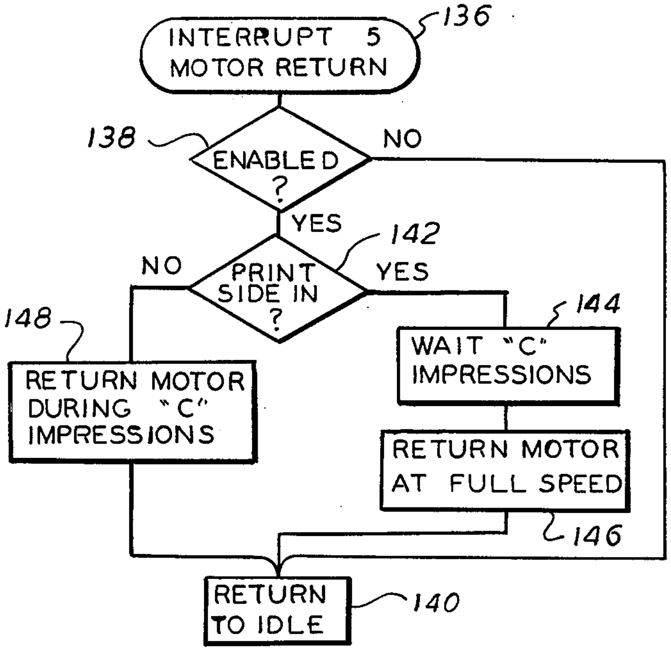
FIG. 5E
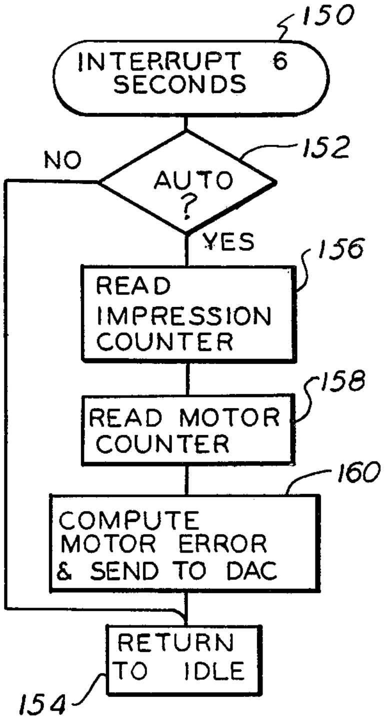
FIG. 5F

CONTROL APPARATUS FOR ADJUSTING THE POSITION OF A WORKPIECE

BACKGROUND OF THE INVENTION

The present invention relates to automatic equipment and, in particular, to web adjusting equipment whose performance is automatically controlled by initial manual adjustments.

In high volume industries such as the printing industry, high production rates, high efficiency and low waste are crucial. Thus it is important to operate the production machinery at its design limits. For machinery such as web handling equipment, the speed of operation is limited by the fact that an operator must make continual manual adjustments in the equipment. Incorrect or untimely adjustment of this running machinery often results in jamming and significant waste of material. To avoid such jamming, high speed machinery is often retarded to reduce in number the inevitable instances of error, whether it be due to inadvertance, poor judgment or poor eye to hand coordination.

It has been thought impossible to automate fully certain equipment where its adjustment relied upon visual observation by an operator. The visual phenonema being observed was deemed too subtle to regulate automatic adjusting apparatus. For example, in the printing industry a web is typically drawn from a roll and therefore has a tendency to remain curled as it is taken from the roll. This tendency to remain curled stems from web memory of the tensile and compressive stresses on opposing sides of the web. Were the web fed directly to a cutter, each severed piece of the web would be free to resume its prior curl. If it curls, the severed piece of web is likely to adhere within and jam the cutting die.

For this reason, it is known in the web handling art to initially induce a reverse curl as the web leaves its roll by conducting the web through a path having a radius of curvature which is smaller than and in an opposite direction to the curvature of the roll. However, since its diameter decreases as the roll expires, the tendency to curl correspondingly increases, requiring continual adjustment of the decurler to neutralize this curl. In the past this operation has been performed manually.

It is impractical to automate by measuring the diameter of an expiring roll since rolls are rapidly and automatically replaced in an apparatus that is densely packed with many moving parts. Furthermore, in some systems succeeding rolls may begin unrolling before its predecessor expires. Moreover, the pattern of adjustment is extremely varied and depends upon the nature and thickness of the web, the speed of operation, the length over which the printed pattern repeats, the separation between successive machines etc. Since the adjustment patterns have such variety it is impractical to simulate such patterns by known equipment.

For a spliced web the timing and extent of adjustment becomes severe, requiring a highly skilled operator. In this situation the tendency of the web to curl on either side of the splice is dramatically different. Consequently, the operator has been required to observe carefully the position of the splice so that the decurler is quickly and drastically readjusted just as the splice reaches the decurler. It will be appreciated that the operator must be very skilled to readjust the decurler such a large amount and retain accurate cancellation of curl.

While the printing arts were just discussed, the foregoing problem arises in other contexts where repetitive operations are performed on an indexed web or other work pieces.

Accordingly, there is a need for an apparatus which has flexibility to handle relatively complicated adjustments, but whose adjustment pattern can be quickly and easily changed by an unskilled operator. Preferably this operator can set the adjustment pattern by performing the actual adjustments on a real time basis and thereafter allowing an automatic apparatus to mimic him.

SUMMARY OF THE INVENTION

In accordance with the illustrative embodiment demonstrating features and advantages of the present invention, it has, for a workpiece adjuster a control signal generating means. The above adjuster may be operated to adjust the position of a periodically indexed web in response to a control signal. The control signal generating means has a meter means for producing a run signal signifying the longitudinal displacement of the web. Also included in the generating means is a sensing means for producing an adjust signal signifying the extent of adjustment of the web. Also included is a memory means and a manually operable means which varies the control signal. The memory means can store at least one contemporaneous pair of values of the run and adjust signals during an initial interindex interval. The signal generating means also includes an automatic means. The automatic means can periodically vary the control signal from index to index to cause the value of the adjust and run signals to periodically correspond to the contemporaneous pair of values. Thus an initial manual adjustment, made through visual observation, controls the subsequent automatic operation of the control signal generator means. Workpieces other than a web may also be employed.

By employing the foregoing apparatus a repetitive operation can be readily automated. This simulation can be manually patterned by a relatively unskilled operator. Essentially the operator manually controls the web adjusting equipment during an initial interval and thereafter these adjustments are automatically repeated. For embodiments where the web adjuster is a decurling apparatus operating on a spliced web, adjustments are performed periodically from splice to splice.

In the preferred embodiment, the operator synchronizes the automatic equipment by depressing a switch upon the creation of each splice, a readily observable phenonema. Thereafter, the automatic equipment waits until the splice reaches the decurling apparatus at which time it rapidly readjusts the decurler to account for the discontinuity at the splice in the tendency of the web to curl. It is preferred that this interval is controlled by predetermining the number of impressions which must elapse in a downstream apparatus such as a cutter/-creaser before readjustment is necessary.

Preferably, the operator manually programs the timing of the readjustment at the splice by initially depressing a "splice" button at the creation of the first splice and a "web lead" button at the arrival of that splice at the decurler. This sequential operation causes storage into memory of the number of impressions required for the splice after its creation to reach the decurler. Importantly, an unskilled operator can readily reset this transition interval and it must be routinely varied depending upon the repeat length and the distance from splicer to decurler, which varies from job to job. For machines where the latter parameters are constant, the web lead switch can be eliminated.

Preferably, the present apparatus subsequently converts the initial discreet adjustments of an operator into a continuous adjustment pattern. Thus throughout its operation the decurler is set near the ideal instead of being readjusted as a jam becomes imminent. For example, the operator may intermittently adjust a web decurler and subsequently depress a "record" button which stores the adjustment and its position on the web into memory. These stored, ordered pairs of data are thereafter used to generate a piecewise linear pattern for smoothly adjusting the web so that between each stored data point the web is linearly adjusted with respect to the elapsed impressions. Moreover, it is preferred that the equipment extrapolate from the first and last data point. This extrapolation is performed by extending the last two (and also the first two) data points outwardly at the same slope.

In one embodiment of the present invention the adjustment sequence is modified depending upon whether the web is being supplied print side in or out. As is well-known in the art, a web supplied print side in (drawn from bottom of roll) has a natural tendency to curl upwardly which is greatest near the end of the roll. Since upward curl is most likely to cause die cut portions of the web to cling to the die and jam the machine, the decurler should not reset until after the splice arrives at the decurler. Therefore, under these circumstances the decurler is not commanded to return to an initial position until the splice arrives at the decurler. Since there is an inherent delay in readjusting the decurler, the foregoing sequence tends to favor downcurl which is a less deleterious problem. On the other hand, a web being supplied print side out (drawn from top of roll) has a natural tendency to curl downwardly. For this reason a maximum reverse or upward curl is induced by the decurler near the end of a roll. Accordingly, were this extreme setting retained after the splice left the decurler, this extreme setting would cause the portions of the web following the splice to be overcompensated, thereby inducing upward curl. Therefore, in the latter situation the decurler is fully reset prior to arrival of the splice thereat by gradually returning the decurler to an initial setting over an interval starting with the creation of the splice. Again, the equipment favors downward curl, a less deleterious condition. Conversely, upward curl can be favored if it is less deleterious in a specific machine.

In the preferred embodiment the longitudinal displacement of the web is measured by counting the number of impressions of a cyclical machine such as a die cutter. This measurement is preferred since it is precise and readily available and any attempt to directly measure the tendency of the web to curl will be difficult and impractical.

Also included in the preferred embodiment are separate counters for measuring certain significant parameters. By providing a separate counter, a relatively simple microprocessor can be used which is not burdened by continually counting increments of motion. For example, it is preferable to count separately the number of revolutions of a servo motor that adjusts the web and also the number of impressions of a die cutter to ascertain the longitudinal displacement of the web. These separate counters can be dedicated to asynchronously gathering this important data without burdening the microprocessor which is then free for other tasks.

The preferred embodiment also has a device which establishes a hierarchy for interrupt signals. These interrupt signals are either manually initiated, clocking or system data signals. This hierarchy ensures that certain significant data that are being entered on a "real time" basis are given a sufficiently high priority so that data are not lost and the computer is not sequenced improperly. Thus a signal initiated by an operator to indicate the creation of a splice is given a high priority so that the present count on the previously mentioned impression counter can be quickly stored in memory. Similarly, the manual "web lead" signal indicating the arrival of a splice at the decurler is also given a high priority. If a subroutine is interrupted by a subroutine having a higher priority, the data being handled by the interrupted subroutine is stored for later use.

Preferably, a pulse generator is used which responds to each revolution of a servo motor that is adjusting the web. This pulse generator employs an apertured disc that is mounted on the output shaft of the servo motor. This disc has a pair of spaced, proximate slots which partially overlap. Revolutions may be counted by observing the passage of these slots with equipment such as a pair of photoelectric transistors. Preferably, a logic circuit records which of the two slots arrives first to determine the direction of rotation of the servo motor. After both of the partially overlapping slots pass, the logic circuit sends out a pulse indicating whether the associated counter should count up or down.

It is also anticipated that the apparatus according to the present invention will have many applications besides adjustment of a web decurler. It is to be appreciated that many other applications exist where it is advantageous to automatically cause the repetition of recurring adjustments.

BRIEF DESCRIPTION OF THE DRAWINGS

The above brief description as well as other objects, features and advantages of the present invention will be more fully appreciated by reference to the following detailed description of a presently preferred but nonetheless illustrative embodiment in accordance with the present invention when taken in conjunction with the accompanying drawings wherein:

FIG. 2 is a front view of a disc employed in the servo of FIG. 1;

FIG. 3 is a side view showing in further detail apparatus employed in the servo of FIGS. 1 and 2;

FIG. 4 is a schematic diagram of pulse generator 38 of FIG. 1; and

FIGS. 5A–5F are flow charts showing the sequence of operations controlled by processor 60 of FIG. 1.

DETAILED DESCRIPTION OF THE PREFERRED EMBODIMENT

Figure 1:
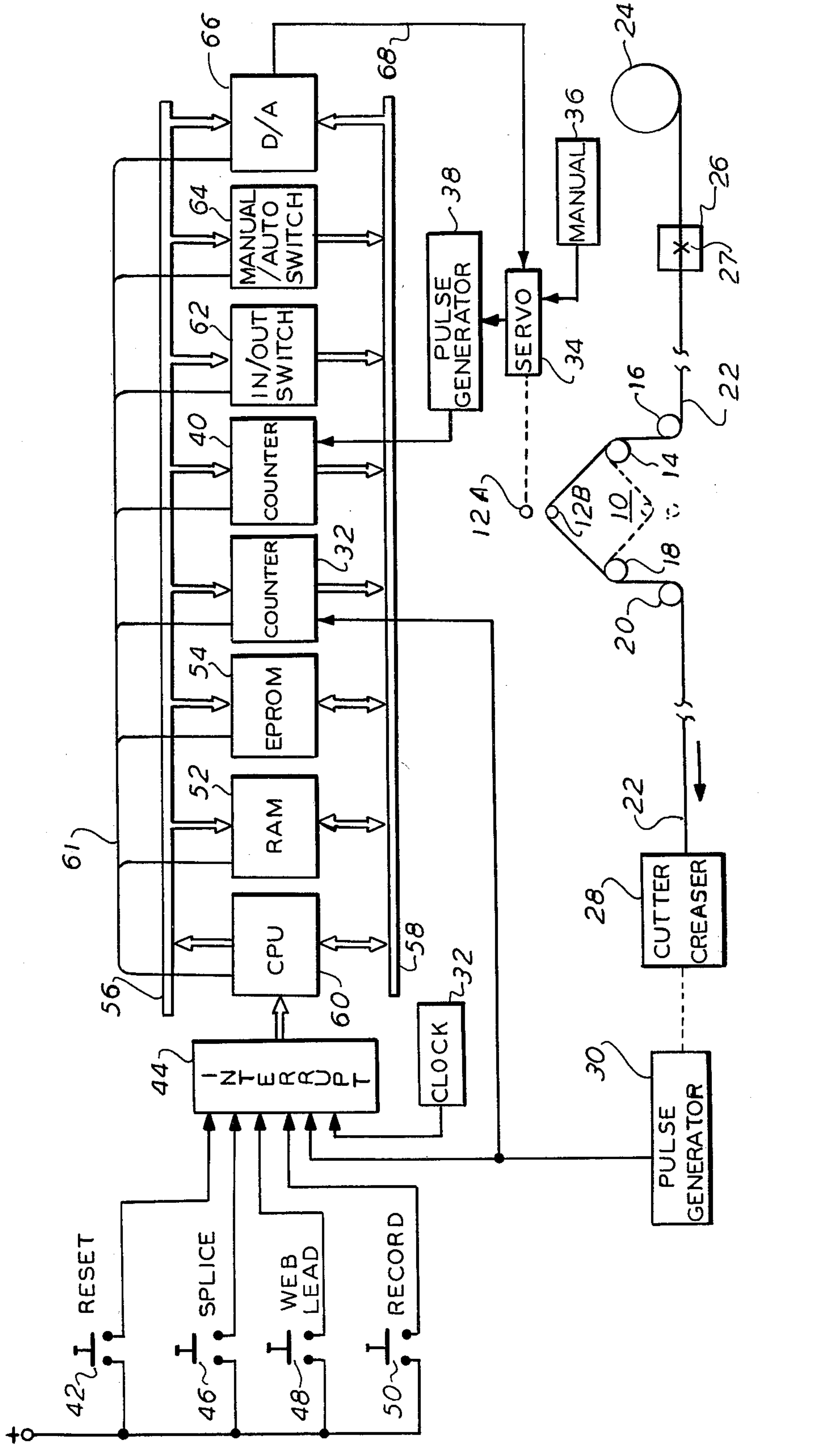
FIG. 1 is a schematic diagram of a control signal generating means according to the present invention.

Referring to FIG. 1, an overall schematic is given of a control signal generating means that operates a web adjuster. This web adjuster is shown herein as decurling apparatus 10. Decurler 10 includes a pair of vertically moveable rollers 12A and 12B. Their vertical adjustability is suggested by the lower illustration in phantom of an alternate position. Decurler 10 also includes an upstream pair of guide rollers 14 and 16 as well as a pair of downstream guide rollers 18 and 20. A web 22 is being supplied to decurler 10 from a supply roll 24. The supply roll 24 cooperates with an automatic splicer which is shown schematically herein as device 26 which is creating a splice 27. As is well known in the art, supply rolls may be automatically replaced upon their expiration by an elaborate mechanical apparatus so that the web is supplied without interruption. Because the elaborate mechanisms required to automatically replace rolls is relatively dense around roll 24, it is impractical to provide a sensor that measures the diameter of roll 24.

As illustrated herein web 22 is fed to a cyclical machine such as cutter/creaser 28. Cutter/creaser 28 is a well known device which employs a reciprocating or rotary die which cuts preprinted sections of web 22 and delivers them to other equipment such as a delivery table (not shown).

The number of impressions rendered by cutter/creaser 28 is, of course, an indication of the longitudinal displacement of web 22. The number of impressions is accordingly monitored by a meter means, shown herein as a pulse generator 30 which transmits a pulse for each impression. These pulses are transmitted to a web counting means shown herein as impression counter 32. Counter 32 employs a plurality of flip flops whose states collectively indicate the number of impressions.

The position of rollers 12A and 12B of decurler 10 are adjusted by servo 34 whose operation can be overridden by manually operable means 36. Device 36 employs a momentarily actuable rocker switch having three positions designated up, down or neutral. As further explained hereinafter, device 36 is used to initially adjust the position of rollers 12A and 12B prior to setting the equipment into its automatic mode of operation.

Each revolution of the motor of servo 34 is sensed by a sensing means, shown herein as pulse generator 38 which drives counter 40. Counter 40 is an up/down counter whose capacity is in excess of twice the number of revolutions which the motor of servo 34 would rotate to bring rollers 12A and 12B from one of its extreme positions to the other.

The system of FIG. 1 responds to certain manual signals initiated by an operator. For example, the system responds to a reset means, shown herein as push button switch 42. Switch 42 is connected between positive potential and interrupt circuit 44, which will be described subsequently hereinafter. Reset switch 42 is actuated by the operator prior to programming the equipment in a manner described subsequently. Also, a manually synchronized means is shown herein as splice switch 46 (push button) which is connected between positive potential and interrupt device 44. Splice switch 46 is actuated by the operator upon the creation of each splice at splicer 26. A manually triggered means is illustrated herein as web lead switch 48 (push button) which is connected between positive potential and interrupt device 44. Switch 48 is manually actuated by the operator when he observes splice 27 arriving at decurler 10. A record means is shown herein as record switch 50 which is connected between positive potential and interrupt device 44. Record switch 50 is actuated by the operator when he wishes to have the equipment of FIG. 1 remember and repeat the setting of decurler 10 at that intersplice position in a manner to be described in further detail hereinafter. The outputs of an independent clock 32 and previously described pulse generator 30 are also connected to interrupt device 44.

A memory means is shown herein as a random access memory (RAM) 52 and an erasable programable read only memory (EPROM) 54. Memory devices 52 and 54 are connected between address bus bar 56 and a data bus bar 58. The structure of these memory devices and their cooperation with the bus bars is so well known in the computing arts that their specific structure need not be described in detail herein.

An automatic means is shown herein as previously mentioned interrupt device 44 together with a central processing unit (CPU) 60 and associated interfacing equipment described hereinafter. Central processing unit 60 is preferably a microprocessor such as Texas Instruments Model 9900. This particular microprocessor is a relatively powerful 16 bit machine, although it is to be appreciated that fewer bits may be employed and that models from other manufacturers can be readily substituted.

Processor 60 together with memory devices 52 and 54 comprise what is commonly referred to as a microcomputer. In this embodiment the sequence of operations executed by processor 60 are determined by programming instructions contained in memory devices 52 and 54. The processor gathers information by forwarding addresses on address bus bar 56 and receiving such information on data bus 58. Similarly, processor 60 can transmit data on data bus 58. To coordinate, the processor 60 also sends and receives certain well known control signals on line 61.

Microprocessor 60 interrogates two manually actuable devices to determine their state: manual control 62 and execute means 64. In this embodiment each of these devices comprise a double throw switch which sets the state of associated latches. The information in these latches is addressable by processor 60 so it can determine the state of the associated switch in a well understood manner. The switch of device 62 is set by the operator to indicate whether roll 24 is being delivered print side in or out. As previously mentioned "print side in" indicates that the roll 24 is being drawn from its bottom (with a consequent natural tendency to curl upwardly) while "print side out" indicates that roll 24 is being drawn from its top so that the web has a natural tendency to curl downwardly. The switch of device 64 is set by the operator in the manual position if he wishes to manually adjust decurler 10 and in the automatic position if he wishes decurler 10 to be adjusted automatically by processor 60.

Digital to analog converter 66 transmits on line 68 an analog signal to servo 34 which causes its motor to rotate at a speed and direction determined by the voltage on line 68. As will be described in further detail hereinafter, the signal on line 68 is an error signal which causes the motor of servo 34 to be driven more vigorously, the further that motor is from the ideal position.

Referring to FIGS. 2 and 3, a servo motor 70 is shown having an output shaft 72. A mark generator, which is part of a motor counting means, is shown herein as apertured disc 74 which includes a pair of proximate apertures 76 and 78. These apertures 76 and 78 partially overlap. Apertures 74 and 76 cooperate with a mark means shown herein as a pair of photoelectric transistors 80 and 82 which are actuable by light transmitted from corresponding light sources 84 and 86, respectively. Essentially, phototransistors 80 and 82 are actuated to produce a pulse when slots 76 and 78, respectively, are adjacent and allow light transmission.

Referring to FIG. 4, a logic means is shown herein as a circuit employing a pair of storage means 90 and 92. In this embodiment devices 90 and 92 are conventional RS flip flops. Terminals A and B are driven by phototransistors 80 and 82, respectively. If the pair of partially overlapping apertures 76 and 78 (FIG. 2) approach the phototransistors 80 and 82 (FIG. 3) when the adjusting rollers 12A and 12B (FIG. 1) are being driven upwardly, terminal A receives a pulse before terminal B (and vice versa). Terminals A and B are connected to the inputs of inverting buffers 91 and 93, respectively, whose outputs are separately connected to different inputs of NAND gate 94. The S input (set) of flip flop 90 is connected to the output of NAND gate 96 whose inputs are separately connected to terminal A and the $\overline{Q}$ output (down terminal) of flip flop 92. The S input (set) of flip flop 92 is connected to the output of NAND gate 98 whose inputs are separately connected to terminal B and the $\overline{Q}$ output (up terminal) of flip flop 90. The output of NAND gate 94 is commonly connected to the R inputs (reset) of flip flops 90 and 92.

To simplify the overall description, the operation of the apparatus of FIGS. 2, 3 and 4 will be briefly described before the operation of the remaining apparatus is described. It is assumed for now that the apertures 76 and 78 (FIG. 2) are not adjacent phototransistors 80 and 82 so that the signals on terminals A and B of FIG. 4 are low. Accordingly, inverters 91 and 93 provide high signals to both inputs of NAND gate 94, producing therefrom a low signal that resets flip flops 90 and 92. Accordingly, the up and down terminals both have high signals, which are separately connected to one input of each of the NAND gates 98 and 96, respectively. The other inputs of NAND gates 96 and NAND gates 98 receive low signals from terminals A and B, respectively. Therefore, the outputs of NAND gates 96 and 98 are high and produce no further effect.

It is assumed for this description that the rollers 12A and 12B (FIG. 1) are being driven upwardly so that the next change of state occurs at terminal A which assumes a high state. As a result, both inputs to NAND gate 96 are high, causing it to produce a low signal which sets flip flop 90 and causes its $\overline{Q}$ output (up terminal) to go low.

Eventually the B terminal also receives a high signal which is also applied to one input of NAND gate 98 but with no further effect since its other input already has a low input. Next, the A terminal goes through a negative transition which causes a high and low signal to be applied to one input of each of NAND gates 94 and 96, respectively, but with no further effect. Finally, the B terminal goes through a negative transition applying a high signal to one input of NAND gate 94 whose other input is already high. Accordingly, a low output is applied by NAND gate 94 to the reset inputs of flip flops 90 and 92, thereby resetting flip flop 90. The consequential positive transition on the up terminal increments counter 40 (FIG. 1) by one count. This completes a cycle of operation of the logic circuit of FIG. 4 and leaves it in the condition initially assumed.

It is to be appreciated that if the first arriving positive pulse was applied to terminal B instead of A then there would be a positive transition on the down terminal which would cause the associated counter to decrement one count.

The manner in which certain subroutines of processor 60 (FIG. 1) are performed will now be briefly described in connection with the flow charts of FIGS. 5A–5F. After that description the overall system operation then will be related.

Flow charts 5A–5F are diagrams that indicate the order in which programming steps are executed by microprocessor 60. It is to be appreciated that the particular order in which many of the programming steps are performed may be varied for different embodiments. In addition certain logical operations or calculations may be deleted in some embodiments for the sake of simplicity or speed. Overall, the five flow charts in FIGS. 5A–5F represent six subroutines which may be executed by microprocessor 60 (FIG. 1) in any order. As previously mentioned, the command to execute a particular subroutine is determined by interrupt circuit 44. This circuit receives: the reset signal (switch 42), splice signal (switch 46), web lead signal (switch 48), record signal (switch 50), impression count signal (generator 30), and a clock signal (clock 32) which cause execution of the subroutines in FIGS. 5A, 5B, 5C, 5D, 5E and 5F, respectively. These subroutines have a priority in the same order, that is, FIG. 5A representing the highest priority and FIG. 5F the lowest. As previously mentioned, a subroutine may be interrupted by a higher priority subroutine. When this happens the lower priority subroutine ceases but the data being currently manipulated are temporarily stored in memory for reexecution after the higher priority subroutine has been completed.

Referring to FIG. 5A, the reset subroutine is illustrated, which is the highest priority subroutine. Upon depression of reset switch 42 (FIG. 1) an interrupt 1 signal is applied by device 44 to processor 60, initiating the reset subroutine. As shown in FIG. 5A the program immediately goes to entry step 100 followed by step 102. Step 102 issues signals to stop servo motor 34 (FIG. 1) and to preset counter 40 to a mid-scale setting. The reset subroutine is manually executed to completely reestablish new operating parameters for decurler 10. Counter 40 is preset to a mid-scale range so that regardless of the position of servo motor 34, counter 40 will have sufficient counting capacity in either direction to accomodate the full number of revolutions which servo 34 might undergo. After execution of step 102 the program is directed to step 104 which is an idle condition. In this condition no further programming steps are executed and the program awaits the next interrupt signal.

The next highest priority interrupt is interrupt 2, shown in FIG. 5B. This interrupt is actuated by manual depression of splice switch 46 (FIG. 1) which causes interrupt device 44 to direct processor 60 into entry step 106. Thereafter step 108 is executed wherein processor 60 takes the count then existing in impression counter 32 and stores it into random access memory 52 at an address designated herein as A. Thereafter logical decision 110 is executed to determine the position of manual/auto switch 64 (FIG. 1). If the switch is in the manual position the program returns to step 112 which is the previously described idle condition, otherwise step 114 is executed. This step essentially enables subsequent execution of the subroutine of FIG. 5E upon occurrence of the next impression count pulse from pulse generator 30. After step 114 the subroutine then returns to step 112 which is the previously mentioned idle condition. The purpose of the subroutine of FIG. 5B is to ascertain the base line conditions at the instant the splice occurs. Essentially, depression of splice switch 46 (FIG. 1) causes the count in impression counter 32 to be stored in memory and, thereafter, all calculations are taken with respect to this count. By this technique the system determines the relative position of the web with respect to that splice.

After the reset and splice subroutines, the next highest subroutine is illustrated in FIG. 5C. This subroutine is initiated when web lead switch 48 (FIG. 1) causes interrupt device 44 to apply to a signal to processor 60 directing it to entry step 116 of FIG. 5C. Thereafter the logical operation of step 118 is performed. At this step the program determines the position of the manual/auto switch 64 (FIG. 1). If the switch is in the auto position the program returns to step 120, the previously mentioned idle condition. This immediate return to idle indicates that the depression of web lead switch 48 (FIG. 1) has no effect if the manual/auto switch of device 64 is in the auto position. If switch 64 is instead in the manual position, step 120 of FIG. 5C is executed. In this step the count in impression counter 32 (FIG. 1) is again read and stored in memory 52 at an address designated herein as B. Next, step 122 is performed which is storage in an address C of the difference between the impression count stored in address B and address A. This difference B-A is the number of impressions occurring from the time splice switch 46 (FIG. 1) was depressed until web lead switch 48 is depressed. This differential count in position C corresponds to the number of impressions that elapse from the creation of a splice until arrival of that splice at decurling apparatus 10 (FIG. 1). This count remains in address C and is used, as subsequently described, to time the rapid readjustment that is required for a new splice.

Referring to FIG. 5D, a record subroutine is illustrated that is useful for establishing the pattern in which adjustments to web decurler 10 are performed from splice to splice. As described in further detail hereinafter, the operator depresses record switch 50 after adjusting decurler 10 if he wishes the equipment to repeat that setting automatically in a subsequent intersplice interval. Depression of record switch 50 actuates interrupt device 44, causing processor 60 to enter step 124 of FIG. 5D. The following logical step 126 determines whether the manual/auto switch 64 (FIG. 1) is in the auto position. If it is, the program immediately returns to step 128, the previously mentioned idle condition, otherwise step 130 is executed. Step 130 is a logical decision point wherein processor 60 determines whether the data to be recorded is establishing a new curve or updating an old curve. Basically, processor 60 determines whether the data is being recorded after the initial or a following splice. If the data are being entered before a second splice is created, step 132 is executed. In step 132 the counts in counters 32 and 40 are stored in memory 52 as an ordered pair of contemporaneous values of the decurler setting versus intersplice position. Thereafter the program returns to step 128 which is the idle condition.

If at the logical decision branch 130 of FIG. 5D microprocessor 60 (FIG. 1) determined that the data being recorded occurred after the creation of a second splice then the program would be directed to execute step 134. The new data point would then be entered among the previously entered data points. It is apparent that any practical curve formed by these data points must be monotonic with respect to an intersplice interval. Monotonicity is necessary since the tendency of a web to curl can only increase as the web is drawn from an expiring roll. Accordingly, processor 60 would next determine which of the older points are not monotonic with respect to the newest data point. Essentially the program would determine which of the older points would produce a slope having the wrong sign and discard them. After execution of step 134, the system returns to step 128 which is the idle condition.

Referring to FIG. 5E, it shows a subroutine that is executed in response to pulse generator 30 (FIG. 1) upon each impression of cutter/creaser 28. Upon execution the subroutine moves from entry step 136 to logical decision branch 138 where the subroutine itself then determines whether it has been enabled. The enabling signal is supplied by step 114 of the splice subroutine of FIG. 5B. Basically, the motor return subroutine of FIG. 5E is not needed until after a splice has been created and therefore this subroutine awaits a signal from the splice subroutine (FIG. 5B) that a splice occurred. If the motor return subroutine of FIG. 5E was not enabled in this fashion, it immediately returns to step 140, the idle condition. Otherwise the program moves to decision branch 142 to determine the setting of print side in/out switch 62 (FIG. 1). If this switch is in the "in" position, the subroutine moves to step 144. In this step the subroutine determines the number of counts stored in address C and awaits the generation of that number of pulses from impression pulse generator 30 (FIG. 1) before going to the following step 146. It will be recalled from the discussion of FIG. 5C that the quantity in address C is the number of impression which occur from the creation of a splice until the arrival of that splice at web decurling apparatus 10 (FIG. 1). It is apparent that the transition to step 146 occurs at the same time that the splice arrives at decurler 10 (FIG. 1). At that time the servo 34 is driven at full speed to an initial position required by processor 60. This timing is significant when the roll is being drawn print side in (from the bottom of a roll), since the maximum tendency to curl upwardly occurs immediately prior to the splice and upward curl is the most deleterious tendency. This waiting of step 144 leaves undisturbed the setting of decurler 10 until after the splice reaches decurler 10.

The foregoing assumed that switch 62 was in the "print side in" position. If switch 62 is in the "print side out" position, it would mean that the maximum tendency toward downward curl would occur immediately prior to the splice. Therefore, decurler 10 will be inducing the maximum reverse or upward curl immediately prior to the splice entering decurler 10. Accordingly, if decurler 10 was not readjusted until after a splice left decurler 10, an overcorrection would result that would cause upward curl, a deleterious situation. For this reason the system operates to readjust decurler 10 before a splice reaches decurler 10. Accordingly, if the switch 62 is in the "print side out" position the subroutine of FIG. 5E performs step 148 in place of steps 144 and 146. Step 148 has no waiting interval and causes converter 66 (FIG. 1) to immediately drive servo 34 toward the previously mentioned initial value. However, servo 34 is not returned at full speed but in a gradual, linear fashion starting from the time step 148 is initiated (immediately after the splice switch 46 is depressed) over an interval ending with the arrival of the splice at decurler 10. This interval is measured by the pulses from generator 30, the interval length being set at a pulse number equal to the number stored in address C. Thus the servo motor is smoothly returned to its initial position before the splice reaches decurler 10 and any tendency toward upward curl is avoided.

Referring to FIG. 5F, the lowest priority subroutine is illustrated. This subroutine is initiated by clock 32 (FIG. 1), which every second applies a pulse to interrupt device 44 to initiate entry step 150. Step 150 is followed by logical decision branch 152 wherein the state of the manual/auto switch 64 (FIG. 1) is determined. If switch 64 is in the manual position the subroutine returns to step 154, the idle condition, otherwise, steps 156 and 158 are executed. These steps cause the counts in impression counter 32 and motor counter 40 to be read. Then these two readings are compared to the ideal reading required by processor 60. This comparison is shown as step 160. This desired motor position is determined by assembling the monotonic data points that were obtained by the record subroutine of FIG. 5D and synthesizing a piecewise linear profile. This piecewise linear profile is a plot of servo motor position versus web position displacement with respect to the last occurring splice. Accordingly, the program computes the counts added to impression counter 32 since the previous splice signal. This diferential amount is applied to the piecewise linear profile just described to develop an ideal servo motor count. This ideal count is compared to the actual count of counter 40 and the difference is transmitted to digital to analog converter 66 to produce an error signal on line 68 (FIG. 1). This error signal is polarized and scaled to quickly drive servo 34 to its ideal position. After this error signal is transmitted the subroutine of FIG. 5F returns to step 154 which is the idle condition. Convergence of servo 34 is assured by observing the count change in counter 40, typically one second later when the subroutine is repeated.

The foregoing discussed individually each of the five subroutines of FIGS. 5A–5F. To facilitate an understanding of the interplay between subroutines the overall system operation will now be summarized. During the first intersplice interval, the operator depresses splice switch 46 (FIG. 1) upon the creation of the first splice. Thereafter he depresses web lead switch 48 when that first splice reaches decurler 10. These sequential depressions allow processor 60 to determine the number of impressions rendered by cutter 28 from the creation of a splice until the arrival of that splice at decurler 10. This differential count is stored for subsequent use.

During this first intersplice interval manual/auto switch 64 is in the manual position and the operator uses control 36 to visually adjust servo 34 and neutralize curling of web 22. After each manual adjustment record button 50 is depressed causing processor 60 to store into memory 52 the counts of counters 32 and 40. These pairs of count values constitute a plurality of data points representing the adjustment pattern of decurler 10 with respect to the last splice. This plurality of data points which are being stored in memory will be monotonic since decurler 10 must react to the fact that the tendency to curl can only increase during any given intersplice interval.

When roll 24 has almost expired the operator places switch 64 into the automatic position. Thereafter the operator awaits the creation of the next splice at which time he depresses splice switch 46 to store the relative position of that splice. Thereafter processor 60 waits until the splice reaches decurler 10 (as initially determined by the differential count of counter 32 between the depression of splice switch 46 and web lead switch 48). When the splice reaches decurler 10, rollers 12A and 12B are driven downwardly at full speed, if switch 62 indicates the roll is being delivered "print side in". If instead the web is delivered "print side out" then rollers 12A and 12B are gradually restored to an initial position in a linear fashion starting with the depression of splice switch 46 and ending when counter 32 is incremented an amount indicating arrival of the splice at decurler 10.

Thereafter processor 60 determines the ideal position of rollers 12A and 12B as roll 24 expires. This ideal pattern is determined by synthesizing a piecewise linear plot between the data points entered by the operator in the previous intersplice interval. The pattern covers the entire interval by extrapolating from each end to maintain the same slope before and after the first data point and the same slope before and after the last data point. The pattern is reproduced by the closed loop comprising digital to analog converter 66, servo 34, generator 38 and counter 40 which acts to produce the ideal count in counter 40. The pattern is followed until the depression of splice switch 46 at the instant that the next splice is created. This initiates a new cycle wherein the adjustment pattern is repeated. For subsequent cycles the only switch which need be depressed by the operator is splice switch 46 upon the creation of each new splice. Of course, as previously described the data points in memory may be revised in a later intersplice interval by placing switch 64 into the manual position, readjusting the servo 34 by manual device 36, depressing record button 50 and then returning switch 64 to its automatic position. This revision eliminates the older data points which would not be monotonic with respect to the new data point.

While the foregoing described control of a web decurler, it will be appreciated that other repetitive adjustments can be performed by the equipment of FIG. 1. Basically, any periodic adjustment which repeats with respect to an index on a workpiece or other synchronizing indicia can be automated by the equipment of FIG. 1. Significantly, the automated pattern is established by the simple expedient of actually performing the operation and thereafter allowing the equipment to mimic the operation. Accordingly, it is anticipated that the present invention will have numerous applications to various repetitive or production operations.

It is also to be appreciated that various modifications may be implemented with respect to the above described preferred embodiment. For example, microprocessor 60 may be programmed in various fashions to execute the previously described operations in a different sequence or in a different priority. Alternatively, the program can be rewritten to perform fewer or more steps depending upon the particular application contemplated. It is also to be appreciated that the manner in which the number of revolutions of a servo motor is counted can be altered for some embodiments. As an example, an alternate counter could respond to fractional revolutions of the motor. In addition, in some embodiments the frequency at which the servo motor error is calculated may be changed. For example, in very high speed operations, the error may be recalculated as often as the processor would allow, that is, every programming cycle. In addition, for embodiments wherein the splice or other indicia can be sensed by an appropriate monitor, this indexing signal can be directly applied to the system without the need for manual intervention. Similarly, where a web lead signal is obtainable by a sensor, manual intervention can similarly be avoided. It is also expected that for some embodiments the rate at which data are recorded may be determined by a separate clock to relieve the operator from periodically depressing a record button.

Obviously, many other modifications and variations of the present invention are possible in light of the above teachings. It is therefore to be understood that within the scope of the appended claims, the invention may be practiced otherwise than as specifically described.

What is claimed is:

1. In a workpiece adjuster operable to adjust the position of a periodically indexed workpiece in response to a control signal, a control signal generating means comprising:

meter means for producing a run signal signifying the displacement of said workpiece;

sensing means for producing an adjust signal signifying the extent of adjustment of said workpiece by said adjuster;

manually operable means coupled to said adjuster for varying the position of said workpiece during an initial interindex interval;

memory means for storing at least one contemporaneous pair of values of said run and adjust signals during said initial interindex interval; and automatic means for generating said control signal from index to index to cause the value of said adjust and run signals to periodically correspond to said contemporaneous pair of values, whereby an initial manual adjustment made by visual observation controls the subsequent automatic operation of the control signal generating means.

2. In the adjuster according to claim 1 wherein said index is a splice in a web and wherein said run signal produced by said meter means signifies longitudinal displacement of said web.

3. In the adjuster according to claim 2 wherein said adjuster conducts said web through a path that is adjustable in response to said control signal.

4. In the adjuster according to claim 3 wherein said generating means comprises:

means coupled to said automatic means and manually operable to produce a splice signal in synchronism with the splicing of said web.

5. In the adjuster according to claim 3 wherein said generating means further comprises:

triggered means coupled to said automatic means and operable to produce a length signal coincidentally with a given splice arriving at a predetermined position with respect to said path.

6. In the adjuster according to claim 5 wherein said triggered means is manually triggered.

7. In the adjuster according to claim 1 wherein said memory means sequentially stores a plurality of contemporaneous pairs of values of said run and adjust signals and wherein said automatic means is operable to periodically vary said control signal from index to index to cause said adjust and run signals to periodically correspond to each successive one of said plurality of contemporaneous pairs.

8. In the adjuster according to claim 7 wherein said automatic means is operable to vary said control signal to cause a piecewise linear change in said adjust signal with respect to said run signal.

9. In the adjuster according to claim 7 or 8 wherein said automatic means is operable to cause said adjust signal to change at the same rate immediately before and after correspondence of the run and adjust signal to the last one of said contemporaneous pairs in an interindex interval.

10. In the adjuster according to claim 5 wherein said generating means further comprises:

synchronized means operable to produce a splice signal coincidentally with the splicing of said web, said memory and automatic means being operable to store a length value corresponding to the distance travelled by said web from the occurence of said splice signal to the occurence of said length signal.

11. In the adjuster according to claim 10 wherein said automatic means is operable to periodically vary said control signal in synchronism with said splice signal.

12. In the adjuster according to claim 11 wherein said automatic means reverses the direction of adjustment of said path after the passage of an interval of said web following said splice signal corresponding to said length value.

13. In the adjuster according to claim 11 wherein said automatic means reverses the direction of adjustment of said path upon occurrence of said splice signal, reversal continuing until passage of an interval of said web corresponding to said length value.

14. In the adjuster according to claim 3 wherein said automatic means comprises:

a manual control having a first and second state, said automatic means being operable in said first and second states to reverse the direction of adjustment of said path before and after, respectively, a splice arrives at a predetermined position with respect to said path.

15. In the adjuster according to claim 1 which is adjusted over a given range by a motor and wherein said sensing means includes:

motor counting means coupled to said automatic means for transmitting a signal signifying the number of revolutions of said motor.

16. In the adjuster according to claim 15 wherein said counting means comprises:

a mark generator for producing a mark signal for each revolution of said motor; and a counter responsive to said mark generator and having a count capacity of at least twice the range of said motor.

17. In the adjuster according to claim 16 wherein said counting means further includes:

reset means for presetting said counter to approximately a midrange value prior to operation of said generating means.

18. In the adjuster according to claim 15 wherein said counting means comprises:

a mark means for sensing the arrival of said motor at either of two proximate predetermined angular positions.

19. In the adjuster according to claim 18 wherein said counting means further comprises:

logic means for sensing the passage of said motor through both of said two proximate predetermined angular positions, said logic means responsive to the first arriving one of said two predetermined positions for providing a signal indicative of direction.

20. In the adjuster according to claim 19 wherein said two predetermined positions are two partially overlapping intervals.

21. In the adjuster according to claim 20 wherein said logic means comprises:

a pair of storage means each operable to change state upon the first arrival of the corresponding one of said two proximate predetermined positions.

22. In the adjuster according to claim 2 wherein said web is fed to a cyclical machine and wherein said meter means comprises:

web counting means for counting the number of cycles of said cyclical machine.

23. In the adjuster according to claim 22 wherein said web is subjected to intermittent periodic motion and wherein said meter means counts the number of periods of intermittent motion experienced by said web.

24. In the adjuster according to claim 1 wherein said automatic means comprises:

execute means having two manually actuable states, said automatic means being operable to record into said memory means said contemporaneous pair of values when said execute means is in a given one of its two states, in the other state said automatic means being operable to vary said control signal according to data stored in said memory means.

25. In the adjuster according to claim 1 or 24 wherein said automatic means comprises:

record means manually actuable for causing storage in said memory means of a current pair of values of said run and adjust signals.

26. In the adjuster according to the claim 3 wherein said memory means is operable to sequentially store a plurality of successive contemporaneous pairs of values of said run and adjust signals before a given splice enters said path.

27. In the adjuster according to claim 26 wherein said memory means is operable after said given splice leaves said path to store another contemporaneous pair of values of said run and adjust signals, said another pair being ranked among said plurality of pairs according to the intersplice position indicated by said another pair.

28. In the adjuster according to claim 27 wherein said plurality of pairs are a monotonic sequence, said automatic means being responsive to said another pair and those of said plurality of pairs which are monotonic with respect to said another pair.

29. In the adjuster according to claim 3 wherein said automatic means performs a hierarchy of operations, lower priority ones of said hierarchy being interruptable by high priority ones.

30. In the adjuster according to claim 29 wherein said generating means includes:

synchronized means coupled to said automatic means and operable to produce a splice signal coincidentally with the splicing of said web, said automatic means operating said memory means in response to said splice signal and at a higher priority than adjustment of said control signal.

31. In an adjuster operable to adjust the position of a workpiece in response to a control signal, a control signal generating means comprising:

meter means for producing a position signal signifying the position of said workpiece;

sensing means for producing an adjust signal signifying the extent of adjustment of said workpiece;

manually operable means coupled to said adjuster for varying the position of said workpiece; and automatic means responsive to said position and adjust signals for generating said control signal, said automatic means being operative to repeat automatically adjustments previously made by said manually operable means.

* * * * *